United States Patent
Kunugi et al.

(10) Patent No.: US 10,344,848 B2
(45) Date of Patent: Jul. 9, 2019

(54) ROBOT, GEAR DEVICE, AND MANUFACTURING METHOD FOR GEAR DEVICE

(71) Applicant: Seiko Epson Corporation, Tokyo (JP)

(72) Inventors: Masanao Kunugi, Fujimi (JP); Hiroyuki Kusumoto, Okaya (JP); Yuya Kataoka, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/658,830

(22) Filed: Jul. 25, 2017

(65) Prior Publication Data

US 2018/0031109 A1 Feb. 1, 2018

(30) Foreign Application Priority Data

Jul. 28, 2016 (JP) .................. 2016-148119

(51) Int. Cl.
*F16H 33/00* (2006.01)
*F16H 35/00* (2006.01)
(Continued)

(52) U.S. Cl.
CPC .......... *F16H 57/048* (2013.01); *B25J 9/1025* (2013.01); *C10M 171/00* (2013.01);
(Continued)

(58) Field of Classification Search
CPC ........................... F16H 49/001; B25J 19/0062
See application file for complete search history.

(56) References Cited

U.S. PATENT DOCUMENTS 4,787,992 A 11/1988 Waynick
5,487,837 A * 1/1996 Ozaki .................. C10M 169/06
508/162

(Continued)

FOREIGN PATENT DOCUMENTS

EP 0745786 A1 12/1996
EP 1867705 A1 12/2007
(Continued)

OTHER PUBLICATIONS

Extended European Search Report for Patent Application No. 17183261.1 dated Nov. 27, 2017 (7 pages).
(Continued)

*Primary Examiner* — Jake Cook
(74) *Attorney, Agent, or Firm* — Harness, Dickey & Pierce, P.L.C.

(57) ABSTRACT

A robot includes a first member, a second member provided to be capable of turning with respect to the first member, and a gear device configured to transmit a driving force from one side to the other side of the first member and the second member. The gear device includes an internal gear, an external gear having flexibility and configured to partially mesh with the internal gear, a wave generator configured to be in contact with the external gear and move a meshing position of the internal gear and the external gear in a circumferential direction, and lubricant disposed in at least one of a meshing section of the internal gear and the external gear and a portion where the external gear and the wave generator are in contact with each other. A last non-seizure load of the lubricant is 300 N or more.

9 Claims, 13 Drawing Sheets

(51) Int. Cl.
*F16H 37/00* (2006.01)
*F16H 57/04* (2010.01)
*B25J 9/10* (2006.01)
*F16H 49/00* (2006.01)
*C10M 171/00* (2006.01)

(52) U.S. Cl.
CPC ......... *F16H 49/001* (2013.01); *F16H 57/041* (2013.01); *F16H 57/0464* (2013.01); *C10M 2207/1256* (2013.01); *C10N 2210/06* (2013.01); *C10N 2230/06* (2013.01); *C10N 2240/04* (2013.01)

(56) References Cited

U.S. PATENT DOCUMENTS

| | | | |
|---|---|---|---|
| 8,262,484 B2* | 9/2012 | Nakatani | B62D 1/16 464/16 |
| 9,090,848 B2 | 7/2015 | Nogami et al. | |
| 9,120,992 B2 | 9/2015 | Nakao et al. | |
| 2002/0174741 A1 | 11/2002 | Kobayashi | |
| 2002/0178861 A1 | 12/2002 | Kobayashi | |
| 2013/0345103 A1 | 12/2013 | Nakao et al. | |
| 2014/0045733 A1 | 2/2014 | Nogami et al. | |

FOREIGN PATENT DOCUMENTS

| | | |
|---|---|---|
| EP | 3002087 A1 | 4/2016 |
| JP | 03-179094 A | 8/1991 |
| JP | 2002-349645 A | 12/2002 |
| JP | 2006-225597 A | 8/2006 |
| JP | 2010-037500 A | 2/2010 |
| JP | 2011-057762 A | 3/2011 |
| JP | 2012-193255 A | 10/2012 |
| WO | WO-2012-141222 A1 | 10/2012 |

OTHER PUBLICATIONS

"General Catalog of HarmonicDrive®", Harmonic Drive Systems, Inc., Sep. 2012, 20 pages.
"Safety Data Sheet for Harmonic Grease SK-1A", Harmonic Systems, Inc., Jun. 15, 2017, 5 pages.
"Safety Data Sheet for Harmonic Grease SK-2", Harmonic Systems, Inc., Jun. 15, 2017, 5 pages.
"Safety Data Sheet for Harmonic Grease SK-3", Harmonic Systems, Inc., Jun. 15, 2017, 5 pages.
"Safety Data Sheet for Harmonic Grease 4B No. 2", Harmonic Systems, Inc., Feb. 2, 2017, 6 pages. (European Market).
"Safety Data Sheet for Harmonic Grease 4B No. 2", Harmonic Systems, Inc., Mar. 23, 2018, 7 pages. (US Market).
Table of Commercially Produced Grease (Lithium Soap-Based) from Office Action dated Aug. 29, 2018 in Japanese Patent Application No. 2016-148119, 1 page.

* cited by examiner

ROBOT, GEAR DEVICE, AND MANUFACTURING METHOD FOR GEAR DEVICE

BACKGROUND

1. Technical Field

The present invention relates to a robot, a gear device, and a manufacturing method for the gear device.

2. Related Art

In a robot including a robot arm including at least one arm, for example, a joint section of the robot arm is driven by a motor. In general, a driving force from the motor is reduced by a reduction gear, which is a type of a gear device.

For example, a reduction gear according to JP-A-3-179094 (Patent Literature 1) is configured from a circular spline (a rigid internal gear), a flex spline (a flexible external gear), and a wave generator. When the wave generator is rotated, the flex spline sequentially moves a meshing position with the circular spline while being elastically deformed. Since the wave generator has a smaller number of teeth than the circular spline, the circular spline rotates in a direction opposite to a rotating direction of the wave generator according to the rotation of the wave generator because of the difference in the number of teeth.

In the reduction gear according to Patent Literature 1, the circular spline and the flex spline mesh with each other with an extremely small backlash. The flex spline and the wave generator frictionally slide with a high load. When characteristics of lubricant used in a meshing section of the circular spline and the flex spline and a frictional sliding section of the flex spline and the wave generator are insufficient and the reduction gear is used in a robot, there has been a problem in that seizure, wear, and the like easily occur relatively early.

SUMMARY

An advantage of some aspects of the invention is to provide a robot, a gear device, and a manufacturing method for the gear device that can reduce damage to the gear device for a long period.

The advantage can be achieved by the following configurations.

A robot according to an aspect of the invention includes: a first member; a second member provided to be capable of turning with respect to the first member; and a gear device configured to transmit a driving force from one side to another side of the first member and the second member. The gear device includes: an internal gear; an external gear having flexibility and configured to partially mesh with the internal gear; a wave generator configured to be in contact with the external gear and move a meshing position of the internal gear and the external gear in a circumferential direction; and lubricant disposed in at least one of a meshing section of the internal gear and the external gear and a portion where the external gear and the wave generator are in contact with each other, a last non-seizure load of the lubricant being 300 N or more.

According to the robot, it is possible to reduce damage such as wear and seizure of the gear device for a long period.

In the robot according to the aspect, it is preferable that, when the last non-seizure load of the lubricant is represented as L [N] and a weld load of the lubricant is represented as W [N], W/L is 3.0 or more.

With this configuration, even if the gear device falls into a seizure state, it is possible to operate the robot for a period of a certain degree of length until the gear device falls into a fixed state. Therefore, it is possible to reduce a situation in which the gear device suddenly falls into the fixed state during the operation of the robot and a damaged area expands and a suspension period of work of the robot in a period until restoration of a damaged part increases.

In the robot according to the aspect, it is preferable that a weld load of the lubricant is 1900 N or more.

With this configuration, it is possible to secure a certain degree of a difference between the last non-seizure load and the weld load of the lubricant.

In the robot according to the aspect, it is preferable that the lubricant includes base oil and lithium soap.

With this configuration, it is possible to form the lubricant as grease in a solid state or a semisolid state. Therefore, it is possible to allow the lubricant to easily stay in a necessary part. It is possible to effectively increase both of the last non-seizure load and the weld load of the lubricant. It is possible to improve shearing stability of the lubricant by using the lithium soap as a thickening agent.

In the robot according to the aspect, it is preferable that the lubricant includes an extreme-pressure agent.

With this configuration, even if a lubrication target section falls into an extreme-pressure lubrication state, it is possible to effectively prevent seizure and scuffing.

In the robot according to the aspect, it is preferable that the lubricant includes an organic molybdenum compound.

With this configuration, it is possible to effectively reduce friction in the lubrication target section. In particular, the organic molybdenum compound exhibits an extreme pressure property and wear resistance equivalent to the extreme pressure property and the wear resistance of molybdenum sulfide. Moreover, the organic molybdenum compound is excellent in oxidation stability compared with the molybdenum sulfide. It is possible to achieve an increase in the life of the lubricant.

A gear device according to another aspect of the invention includes: an internal gear; an external gear configured to mesh with the internal gear; a sliding member configured to slide with respect to the internal gear or the external gear; and lubricant disposed in at least one of a meshing section of the internal gear and the external gear and a sliding section of the internal gear or the external gear and the sliding member, a last non-seizure load of the lubricant being 300 N or more.

According to the gear device, it is possible to reduce damage such as wear and seizure for a long period.

A manufacturing method for a gear device according to another aspect of the invention includes: disposing lubricant, a last non-seizure load of which is 300 N or more, on at least one member of two members selected from an internal gear, an external gear that meshes with the internal gear, and a sliding member that slides with respect to the internal gear or the external gear; and assembling the two members to interpose the lubricant between the two members.

According to the manufacturing method for the gear device, it is possible to obtain the gear device capable of reducing damage such as wear and seizure for a long period.

BRIEF DESCRIPTION OF THE DRAWINGS

The invention will be described with reference to the accompanying drawings, wherein like numbers reference like elements.

DESCRIPTION OF EXEMPLARY EMBODIMENTS

A robot, gear devices, and manufacturing methods for the gear devices according to preferred embodiments of the invention are explained in detail below with reference to the accompanying drawings.

1. Robot

First, a robot according to an embodiment of the invention is explained.

Figure 1:
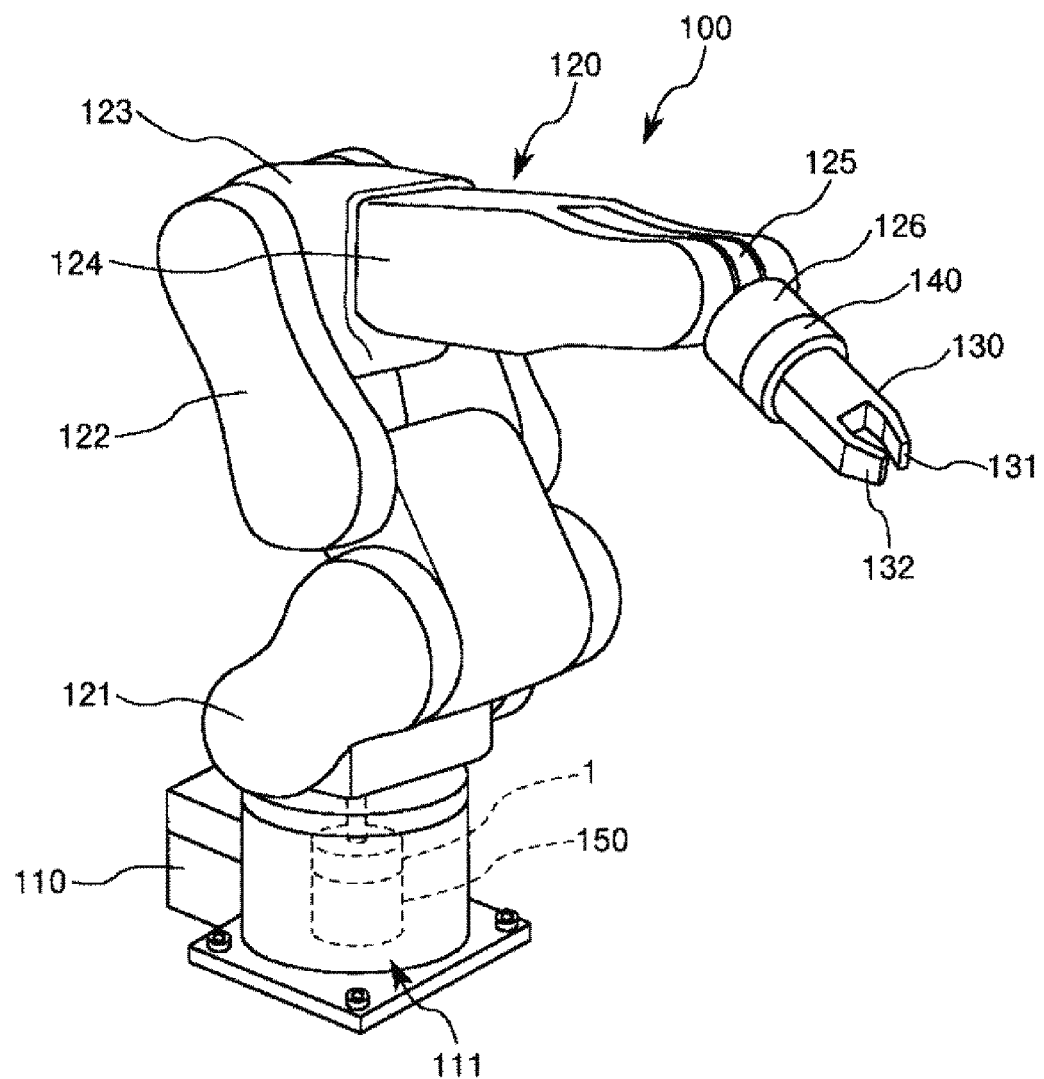
FIG. 1 is a diagram showing a schematic configuration of a robot according to an embodiment of the invention.

FIG. 1 is a diagram showing a schematic configuration of the robot according to the embodiment of the invention.

A robot 100 shown in FIG. 1 can perform work such as supply, removal, conveyance, and assembly of a precision instrument and components configuring the precision instrument (target objects).

The robot 100 is a six-axis vertical multi-joint robot and includes a base 111, a robot arm 120 connected to the base 111, and a force detector 140 and a hand 130 provided at the distal end portion of the robot arm 120. The robot 100 includes a control device 110 that controls a plurality of driving sources (including a motor 150 and a gear device 1) that generate power for driving the robot arm 120.

The base 111 is a portion for attaching the robot 100 to any setting place. Note that a setting place of the base 111 is not particularly limited. Examples of the setting place of the base 111 include a floor, a wall, a ceiling, and a movable truck.

The robot arm 120 includes a first arm 121 (an arm), a second arm 122 (an arm), a third arm 123 (an arm), a fourth arm 124 (an arm), a fifth arm 125 (an arm), and a sixth arm 126 (an arm). These arms are coupled in this order from the proximal end side (the base side) toward the distal end side. The first arm 121 is connected to the base 111. The hand 130 (an end effector) that grips various components and the like is detachably attached to the distal end of the sixth arm 126.

The hand 130 includes two fingers 131 and 132 and can grip the various components and the like with the fingers 131 and 132.

In the base 111, a driving source including the motor 150 such as a servomotor, which drives the first arm 121, and the gear device 1 (a reduction gear) is provided. Although not shown in the figure, pluralities of driving sources including motors and reduction gears are respectively provided in the arms 121 to 126 as well. The driving sources are controlled by the control device 110.

In the robot 100, the gear device 1 transmits a driving force for turning the first arm 121 with respect to the base 111 from the base 111 side to the first arm 121 side. The gear device 1 can reduce the driving force and turn the first arm 121 with respect to the base 111 by functioning as a reduction gear. Note that "turn" includes moving in both directions including one direction and the opposite direction of the one direction with respect to a certain center point and rotating around the certain center point.

As explained above, the robot 100 includes the base 111, which is a "first member", the first arm 121, which is a "second member" provided to be capable of turning with respect to the base 111, and the gear device 1 that transmits a driving force from one side to the other side of the base 111 (the first member) and the first arm 121 (the second member). Note that any number of arms sequentially selected from the first arm 121 side among the second to sixth arms 122 to 126 may be grasped as the "second member". That is, a structure including the first arm 121 and any number of arms sequentially selected from the first arm 121 side among the second to sixth arms 122 to 126 is also considered to be the "second member". For example, a structure including the first and second arms 121 and 122 is also considered to be the "second member". The entire robot arm 120 is also considered to be the "second member". The "second member" may include the hand 130. That is, a structure including the robot arm 120 and the hand 130 is also considered to be the "second member".

The robot 100 explained above can reduce damage such as wear and seizure of the gear device 1 for a long period by including the gear device 1 explained below.

2. Gear Device

Gear devices according to embodiments of the invention are explained below.

First Embodiment

Figure 2:
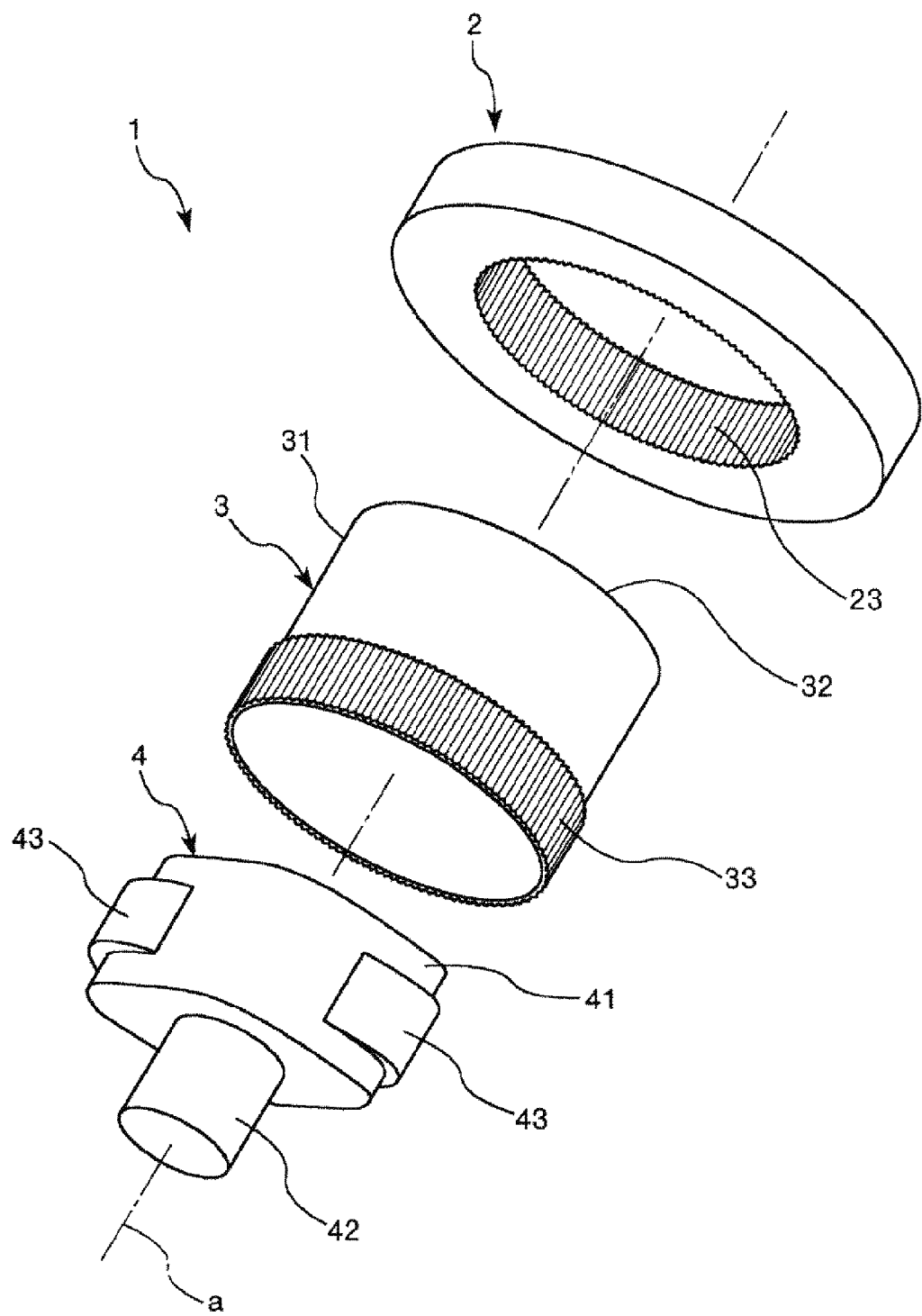
FIG. 2 is an exploded perspective view showing a gear device according to a first embodiment of the invention.
Figure 3:
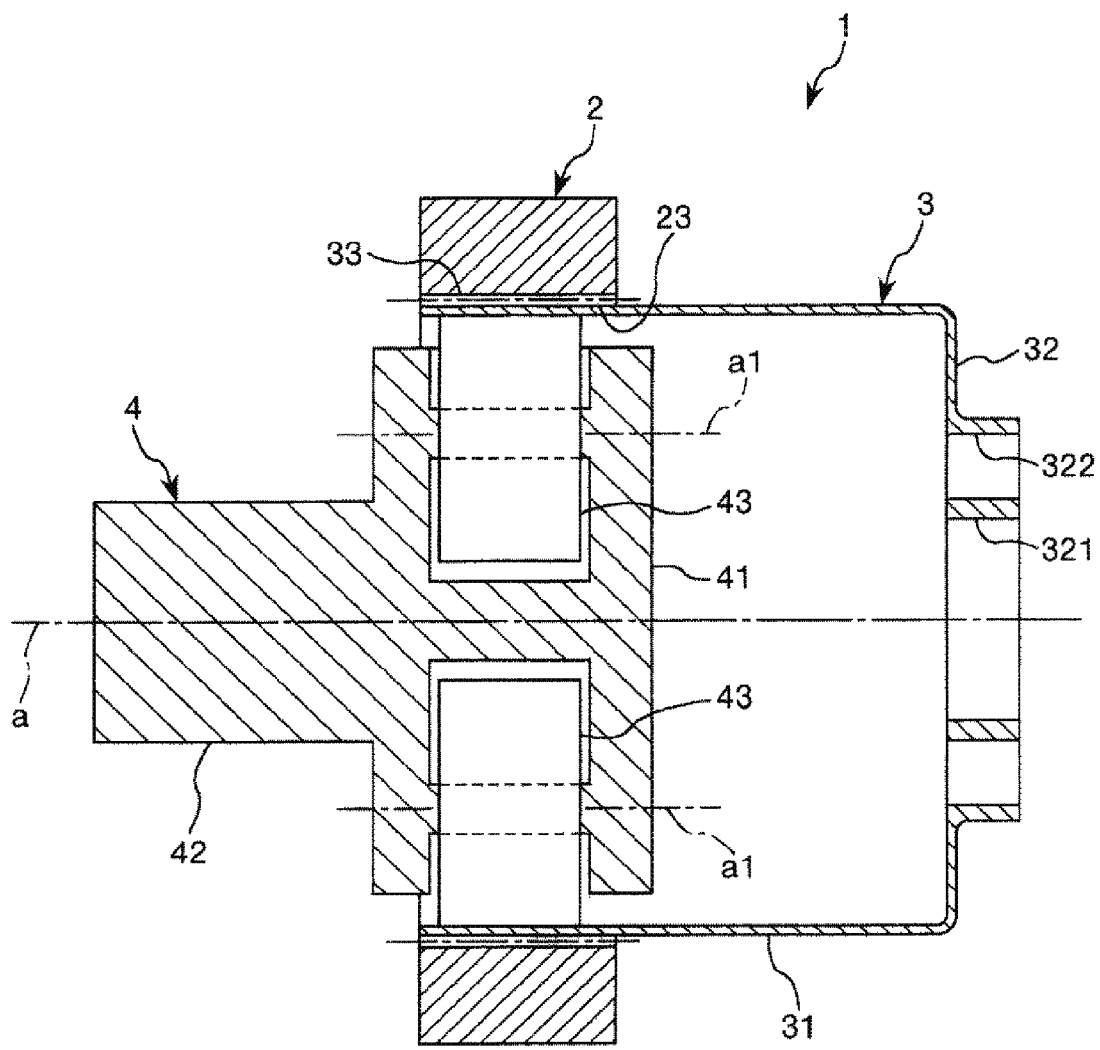
FIG. 3 is a longitudinal sectional view of the gear device shown in FIG. 2.
Figure 4:
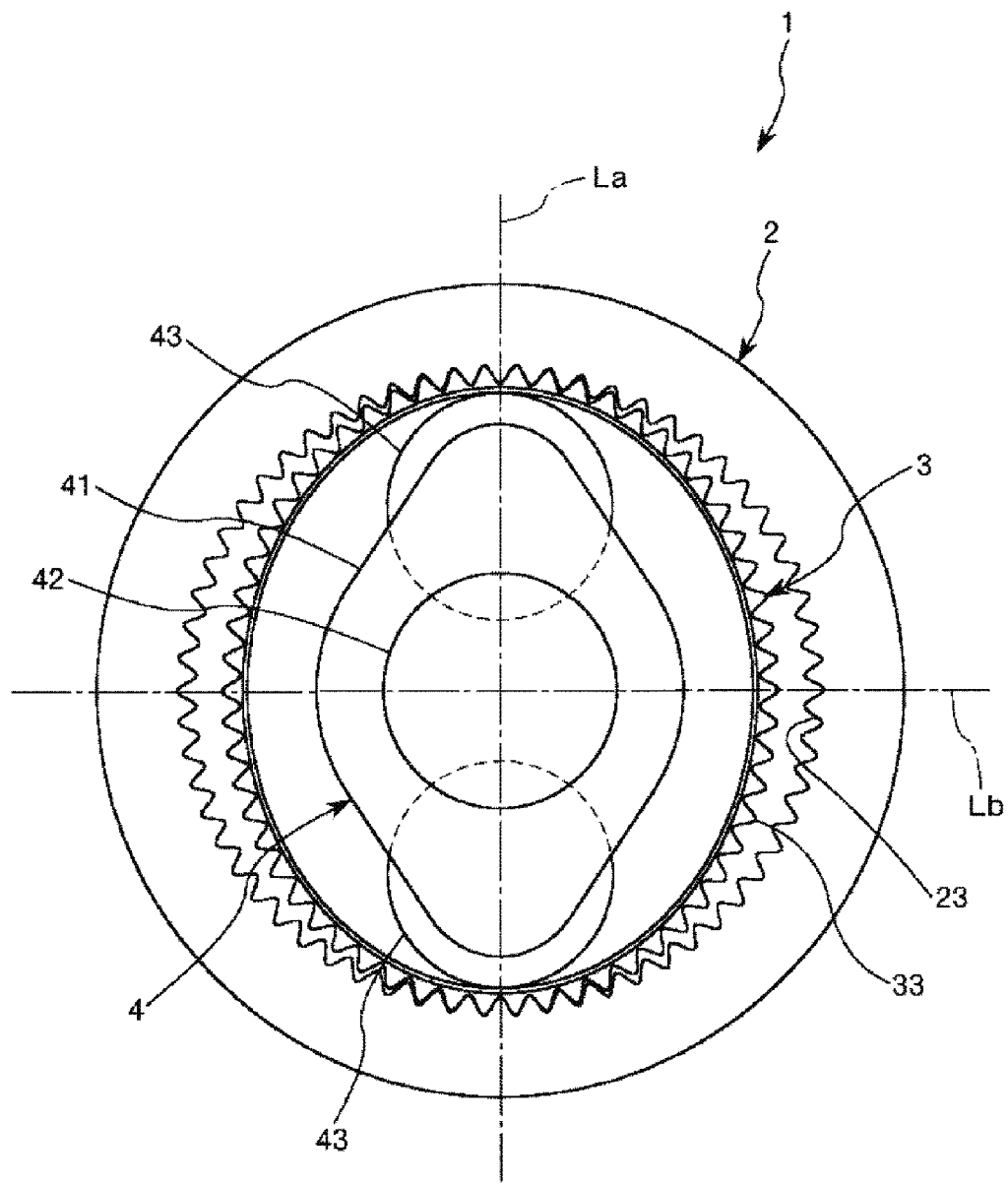
FIG. 4 is a front view of the gear device shown in FIG. 2.
Figure 5:
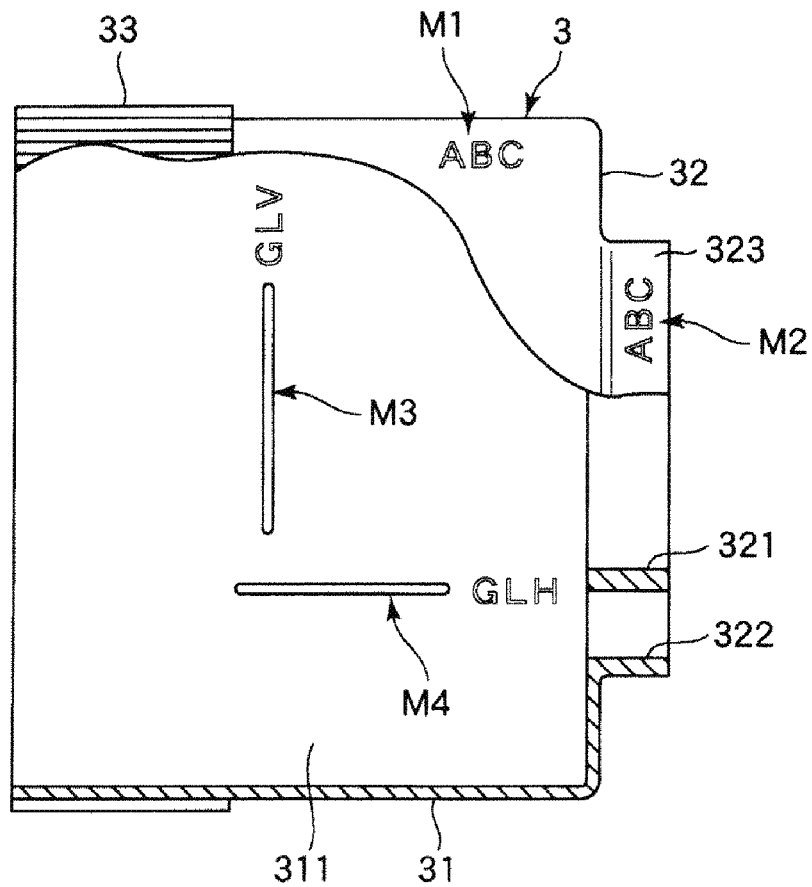
FIG. 5 is a partial sectional side view of an external gear included in the gear device shown in FIG. 2.

FIG. 2 is an exploded perspective view showing a gear device according to a first embodiment of the invention. FIG. 3 is a longitudinal sectional view of the gear device shown in FIG. 2. FIG. 4 is a front view of the gear device shown in FIG. 2. FIG. 5 is a partial sectional side view of an external gear included in the gear device shown in FIG. 2. Note that, in the figures, for convenience of explanation, the dimensions of sections are exaggerated and illustrated according to necessity. Dimension ratios among the sections do not always coincide with actual dimension ratios.

The gear device 1 shown in FIGS. 2 to 4 is a wave gear device and is used as, for example, a reduction gear. The gear device 1 includes a rigid gear 2, which is an internal gear, a flexible gear 3, which is a cut-type external gear disposed on the inner side of the rigid gear 2, and a wave generator 4 disposed on the inner side of the flexible gear 3.

The gear device 1 includes a portion where the lateral cross section of the flexible gear 3 is deformed into an elliptical shape or an oval shape by the wave generator 4. The flexible gear 3 meshes with the rigid gear 2 at both end portions on the major axis side of the portion. The numbers of teeth of the rigid gear 2 and the flexible gear 3 are different from each other.

In the gear device 1, for example, when a driving force (e.g., a driving force from the motor 150) is input to the wave generator 4, the rigid gear 2 and the flexible gear 3 relatively rotate around an axis "a" because of the difference in the number of teeth while a meshing position of the rigid gear 2 and the flexible gear 3 moves in the circumferential direction. Consequently, it is possible to decelerate the driving force input to the wave generator 4 from the driving source and output the driving force from the flexible gear 3. That is, it is possible to realize a reduction gear in which the wave generator 4 is on an input shaft side and the flexible gear 3 is on an output shaft side.

The configuration of the gear device 1 is briefly explained below.

As shown in FIGS. 2 to 4, the rigid gear 2 is a gear configured by a rigid body that substantially does not bend in the radial direction. The rigid gear 2 is a ring-shaped internal gear including internal teeth 23. In this embodiment, the rigid gear 2 is a spur gear. That is, the internal teeth 23 have tooth traces parallel to the axis "a". Note that the tooth traces of the internal teeth 23 may be inclined with respect to the axis "a". That is, the rigid gear 2 may be a helical gear or a double helical gear.

The flexible gear 3 is inserted through the inner side of the rigid gear 2. The flexible gear 3 is a gear having flexibility deflectively deformable in the radial direction and is an external gear including external teeth 33 (teeth) that mesh with the internal teeth 23 of the rigid gear 2. The number of teeth of the flexible gear 3 is smaller than the number of teeth of the rigid gear 2. Since the numbers of teeth of the flexible gear 3 and the rigid gear 2 are different from each other in this way, it is possible to realize a reduction gear.

In this embodiment, the flexible gear 3 is formed in a cup shape opened at one end. The external teeth 33 are formed at the end portion on the opening side. The flexible gear 3 includes a tubular (more specifically, cylindrical) trunk section 31 (a cylinder section) around the axis "a" and a bottom section 32 connected to one end portion side in the axis "a" direction of the trunk section 31. Consequently, it is possible to allow the end portion of the trunk section 31 on the opposite side of the bottom section 32 to easily bend in the radial direction. Therefore, it is possible to realize satisfactory deflective meshing of the flexible gear 3 with the rigid gear 2. It is possible to increase the rigidity of the end portion on the bottom section 32 side of the trunk section 31. Therefore, it is possible to stably connect an input shaft or an output shaft to the bottom section 32.

As shown in FIG. 3, in the bottom section 32, a hole 321 piercing through the bottom section 32 along the axis "a" and a plurality of holes 322 piercing through the bottom section 32 around the hole 321 are formed. A shaft body on an output side can be inserted through the hole 321. The holes 322 can be used as screw holes through which screws for fixing the shaft body on the output side to the bottom section 32 are inserted. Note that the holes only have to be provided as appropriate and can be omitted.

As shown in FIG. 5, markings M1 and M2 are inscribed on the outer surface of the flexible gear 3. Each of the markings M1 and M2 represents characters "ABC" in the figure for convenience. However, the markings M1 and M2 represent information such as a manufacturer name, a model number, or a serial number using, for example, characters, a figure, a sign, a code, or the like. Note that the markings can also be provided on the outer surfaces of the rigid gear 2 and the wave generator 4.

In particular, the marking M1 is provided on the outer circumferential surface of the trunk section 31. The marking M2 is provided on the outer surface along the circumferential direction of a projecting section 323 of the bottom section 32. By inscribing the markings M1 and M2 on the cylindrical surface of the outer surface of the flexible gear 3 in this way, even in a state in which the input shaft or the output shaft is connected to the bottom section 32 of the flexible gear 3, it is possible or easy to visually recognize the markings M1 and M2. It is possible to reduce deterioration in mechanical strength of the flexible gear 3 due to the markings M1 and M2. On the outer surface of the flexible gear 3, a portion other than the projecting section 323 of the bottom section 32 (i.e., a portion further on the outer circumference side than the projecting section 323 of the bottom section 32) is requested to have high fatigue strength in realizing high durability of the gear device 1. From such a viewpoint, it is undesirable to inscribe a marking in the portion because the fatigue strength of the portion is deteriorated and the durability of the gear device 1 is deteriorated.

As shown in FIG. 5, marks M3 and M4 are inscribed on the inner circumferential surface of the flexible gear 3. The marks M3 and M4 are used to measure a supply amount of grease when the grease is supplied to the inner side of the flexible gear 3. That is, the flexible gear 3 inscribed with the marks M3 and M4 is used like a measuring cup to set an amount of the grease filled on the inner side of the flexible gear 3 to an appropriate amount. The mark M3 includes linear marks extending along the axis of the flexible gear 3 on the inner circumferential surface of the trunk section 31. The mark M3 is suitable for being used for measurement of the grease when the axis of the flexible gear 3 faces a direction along the vertical direction. On the other hand, the mark M4 includes linear marks extending along the circumferential direction around the axis of the flexible gear 3. The mark M4 is suitable for being used for measurement of the grease when the axis of the flexible gear 3 faces a direction along the horizontal direction.

As explained above, by inscribing both of the two marks M3 and M4 on the flexible gear 3, it is possible to perform the measurement of the grease irrespective of the posture of the flexible gear 3. Therefore, even in a state in which the flexible gear 3 is kept attached to the robot 100, it is possible to accurately perform the measurement of the grease. A method of forming the marks M3 and M4 is not particularly limited. Examples of the method include imprinting, laser marking, mechanical machining by a lathe or the like, and application of paint, pigment, ink or the like. However, a method that has resistance against the grease and does not deteriorate the mechanical strength of the flexible gear 3 as much as possible is desirable.

In the illustration, the mark M3 includes characters "GLV" indicating that the mark M3 is used for the measurement of the grease when the axis of the flexible gear 3 faces the direction along the horizontal direction. The mark M4 includes characters "GLH" indicating that the mark M4 is used for the measurement of the grease when the axis of the flexible gear 3 faces the direction along the vertical direction. Note that the illustrated forms of the marks M3 and M4 are examples. Forms of the marks M3 and M4 are not limited to the illustrated forms as long as the marks M3 and M4 can be used for the measurement of the grease. For example, the linear marks included in the mark M3 are formed in a part in the circumferential direction of the flexible gear 3 in the figure. However, the linear marks may be formed over the entire circumference in the circumferential direction of the flexible gear 3. The linear marks included in the mark M4 only have to be provided in at least two portions among three portions including two portions crossing a surface parallel to the axis of the inner circumferential surface of the trunk section 31 and a portion crossing the surface on the inner surface of the bottom section 32.

As shown in FIG. 3, the wave generator 4 is disposed on the inner side of the flexible gear 3 and is capable rotating around the axis "a". The wave generator 4 deforms a lateral cross section of a portion on the opposite side of the bottom section 32 of the flexible gear 3 into an elliptical shape or an oval shape having a major axis La and a minor axis Lb and meshes the external teeth 33 with the internal teeth 23 of the rigid gear 2. The flexible gear 3 and the rigid gear 2 are meshed with each other on the inside and the outside to be capable of rotating around the same axis "a".

In this embodiment, the wave generator 4 includes a main body section 41, a shaft section 42 projecting along the axis "a" from the main body section 41, and a pair of rollers 43 provided to be capable of rotating around an axis al parallel to the axis "a" with respect to the main body section 41. In the wave generator 4, the pair of rollers 43 expand the flexible gear 3 from the inner side while rolling on the inner circumferential surface of the flexible gear 3. The main body section 41, the shaft section 42, and the pair of rollers 43 are capable of rotating around the axis "a". Therefore, for example, when a driving force is input to the wave generator 4 from the driving source, a meshing position of the rigid gear and the flexible gear 3 moves in the circumferential direction.

The configuration of the gear device 1 is briefly explained above. In the gear device 1, as explained above, for example, when a driving force (e.g., a driving force from the motor 150) is input to the wave generator 4, the rigid gear 2 and the flexible gear 3 relatively rotate around the axis "a" because of the difference in the number of teeth while the meshing position of the rigid gear 2 and the flexible gear 3 moves in the circumferential direction. In the gear device 1, lubricant is used in each of a meshing section of the rigid gear 2 and the flexible gear 3, portions where the main body section 41 and the rollers 43 of the wave generator 4 are in contact with each other, and portions where the flexible gear 3 and the rollers 43 of the wave generator 4 are in contact with each other in order to reduce friction. Matters concerning the lubricant are explained in detail below.

Figure 6:
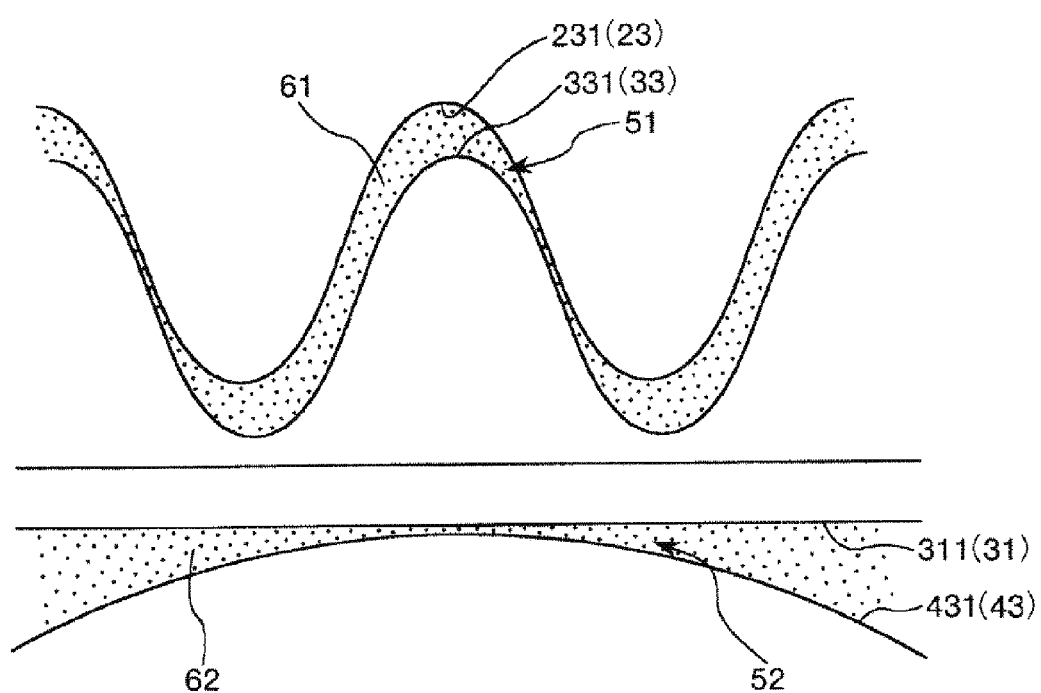
FIG. 6 is a diagram for explaining lubricants disposed in a meshing section and a sliding section of the gear device shown in FIG. 2.
Figure 7:
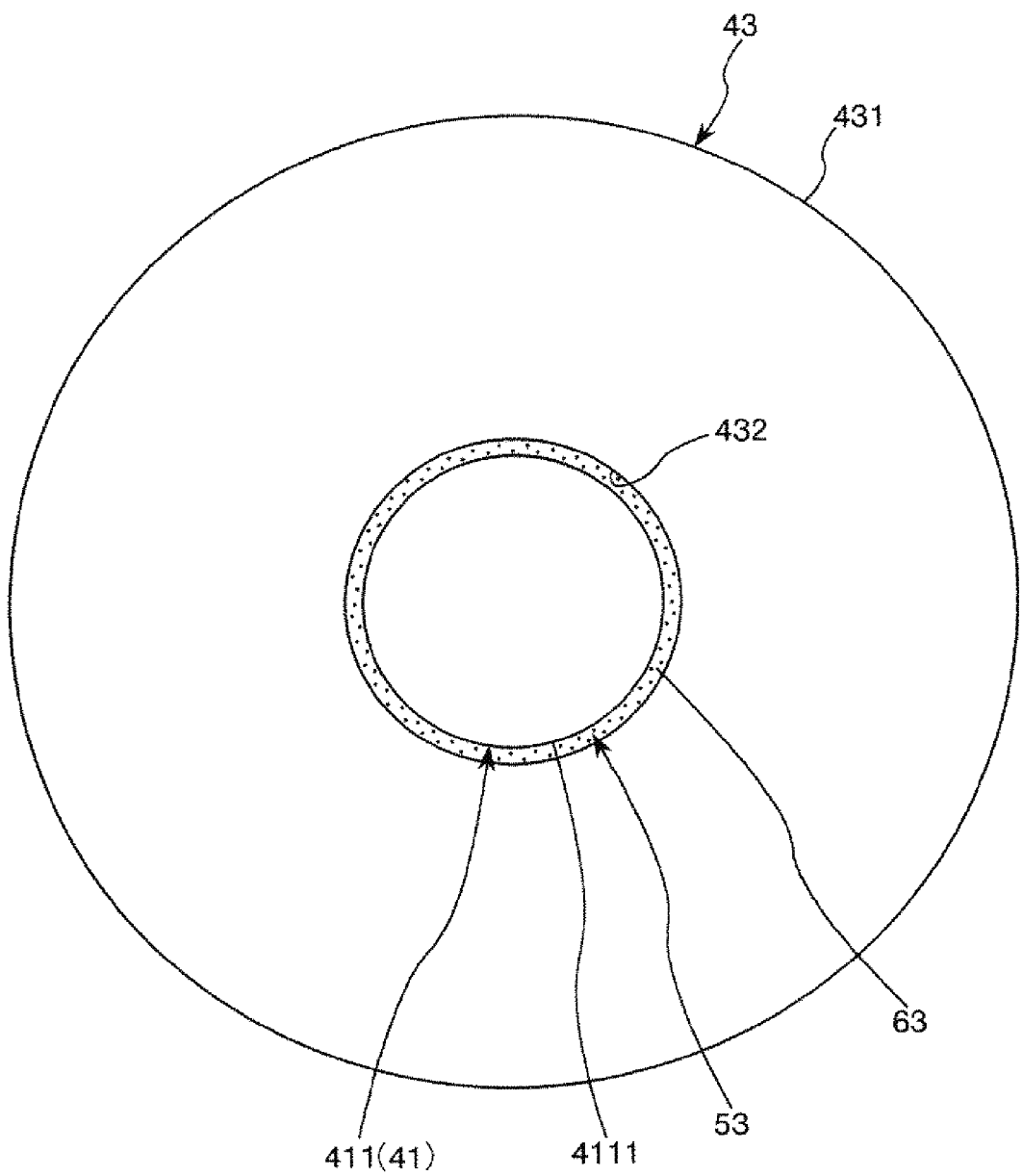
FIG. 7 is a diagram for explaining lubricant disposed in another sliding section of the gear device shown in FIG. 2.
Figure 8:
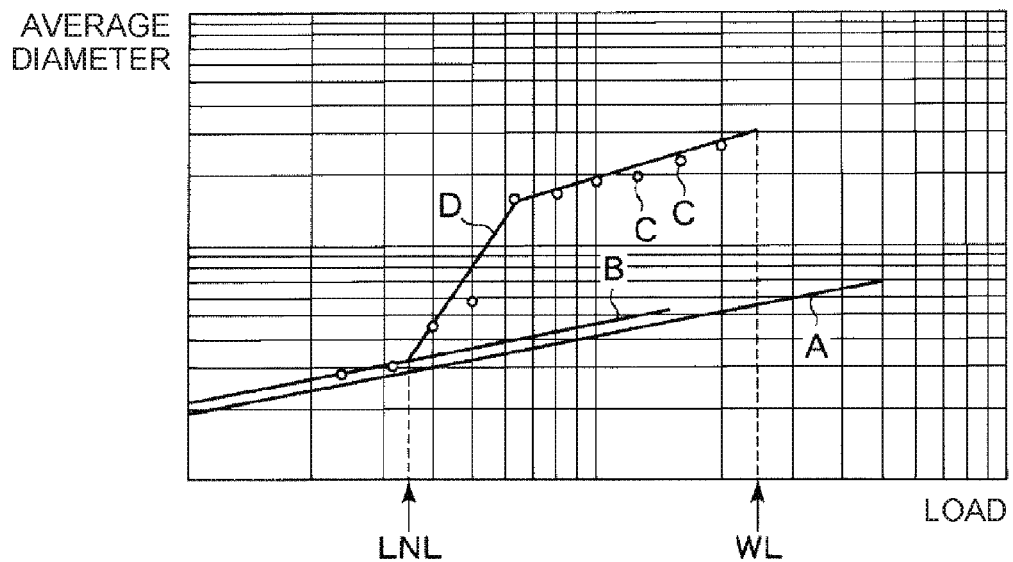
FIG. 8 is a graph for explaining a last non-seizure load (LNL) and a weld load (WL) of lubricant.

FIG. 6 is a diagram for explaining lubricants disposed in a meshing section and a sliding section of the gear device shown in FIG. 2. FIG. 7 is a diagram for explaining lubricant disposed in another sliding section of the gear device shown in FIG. 2. FIG. 8 is a graph for explaining a last non-seizure load (LNL) and a weld load (WL) of lubricant.

As explained above, the gear device 1 includes the rigid gear 2, which is the "internal gear", the flexible gear 3, which is the "external gear" that has flexibility and partially meshes with the rigid gear 2, and the wave generator 4 that is in contact the flexible gear 3 and moves the meshing position of the rigid gear 2 and the flexible gear 3 in the circumferential direction (see FIG. 3). As shown in FIG. 6, lubricant 51 is disposed in a meshing section 61, which is a region between a teeth surface 231 of the internal teeth 23 of the rigid gear 2 and a teeth surface 331 of the external teeth 33 of the flexible gear 3. Lubricant 52 is disposed in a sliding section 62, which is a region between an inner circumferential surface 311 of the trunk section 31 of the flexible gear 3 and an outer circumferential surface 431 of the roller 43 of the wave generator 4. Further, as shown in FIG. 7, in the wave generator 4, the main body section 41 includes a shaft section 411 that rotatably supports the roller 43. Lubricant 53 is disposed in a sliding section 63, which is a region between an inner circumferential surface 432 of the roller 43 and an outer circumferential surface 4111 of the shaft section 411. Note that the wave generator 4 is a "sliding member" that slides with respect to the flexible gear 3 (the external gear). The sliding section 62 is a portion where the flexible gear 3 and the wave generator 4 are in contact with each other and is a "sliding section" where the flexible gear 3 and the wave generator 4 slide.

A last non-seizure load of each of the lubricants 51, 52, and 53 disposed in the meshing section 61 and the sliding sections 62 and 63 (hereinafter referred to as "lubrication target sections" as well) is 300 N or more. Consequently, it is possible to reduce damage such as wear and seizure of the gear device 1 for a long period. Note that, if the last non-seizure load of at least one of the lubricant 51 disposed in the meshing section 61 of the rigid gear 2 and the flexible gear 3 and the lubricant 52 disposed in the sliding section 62, which is a portion where the flexible gear 3 and the wave generator 4 are in contact with each other, is 300 N or more, it is possible to reduce damage such as wear and seizure of the gear device 1 for a long period.

The "last non-seizure load" (an LNL value) indicates a limit load until an oil film (a lubrication film) formed by lubricant is fractured by a load and seizure is caused by direct contact of two surfaces that should be protected of a lubrication target section. The "last non-seizure load" is measured by a four-ball extreme-pressure lubricant test conforming to ASTM D2596 (when the lubricant is grease) or ASTM D2783 (when the lubricant is lubrication oil). In the four-ball extreme-pressure lubricant test, for example, as shown in FIG. 8, a plurality of measurement values C are obtained by measuring, for each of loads applied to an iron ball used for the test, a diameter of a wear mark of the iron ball. The horizontal axis in FIG. 8 indicates the load applied to the iron ball and the vertical axis in FIG. 8 indicates the diameter (an average diameter) of the wear mark of the iron ball. A straight line A shown in FIG. 8 is obtained on the basis of a theoretical value due to Herzian contact of a diameter of a contact surface corresponding to a load of the iron ball in which seizure does not occur. A straight line B shown in FIG. 8 is obtained according to a correction value based on the straight line A. A load at the time when a line segment D obtained from the plurality of measurement values C starts to separate from the straight line B is the "last non-seizure load". A load at the time when the iron ball used in the test is fixed by welding is the "weld load" (a WL value). That is, the "weld load" (the WL value) indicates a load of the two surfaces, which should be protected of the lubrication target section, being melted and fused by frictional heat generated by sliding of the two surfaces.

When the last non-seizure load of the lubricants 51, 52, and 53 is represented as L [N] and the weld load of the lubricants 51, 52, and 53 is represented as W [N], W/L is desirably 3.0 or more, more desirably 3.0 or more and 9.0 or less, and still more desirably 3.0 or more and 7.0 or less. Consequently, even if the gear device 1 falls into a seizure state, it is possible to operate the robot 100 for a period of a certain degree of length until the gear device 1 falls into a fixed state. Therefore, it is possible to reduce a situation in which the gear device 1 suddenly falls into the fixed state during the operation of the robot 100 and a damaged area expands and a suspension period of work of the robot 100 in a period until restoration of a damaged part increases.

The weld load of the lubricants 51, 52, and 53 is desirably 1900 N or more and more desirably 2400 N or more and 5000 N or less. Consequently, it is possible to secure a certain degree of a difference between the last non-seizure load and the weld load of the lubricants 51, 52, and 53.

A load wear index of the lubricants 51, 52, and 53 is desirably 250 or more and more desirably 450 or more. Consequently, it is possible to improve the wear resistance of the lubricants 51, 52, and 53. The "load wear index" (an LWI value) is calculated from a test result of the four-ball extreme-pressure lubricant test. The "load wear index" is a numerical value calculated from a mark diameter between loads with which contact of the two surfaces that should be protected of the lubrication target section occurs. The "load wear index" is an overall indicator of a load bearing capacity of the lubricant indicating that the lubricant is more excellent in wear resistance as the numerical value is higher.

Each of the lubricants 51, 52, and 53 may be either grease or lubrication oil but are desirably grease. That is, each of the lubricants 51, 52, and 53 desirably includes base oil and a thickening agent. Consequently, it is possible to form the lubricants 51, 52, and 53 as grease in a solid state or a semisolid state. Therefore, it is possible to allow the lubricants 51, 52, and 53 to easily stay in necessary parts. It is possible to effectively increase both of the last non-seizure load and the weld load of the lubricants 51, 52, and 53. Therefore, it is possible to easily obtain the lubricants 51, 52, and 53 that have the last non-seizure load and the weld load in the ranges explained above. Examples of the thickening agent include soap such as calcium soap, calcium composite soap, sodium soap, aluminum soap, lithium soap, and lithium composite soap and non-soap such as polyurea, sodium terephthalate, polytetrafluoro-ethylene (PTFE), organic bentonite, and silica gel. Among these agents, one kind can be independently used or two or more kinds can be used in combination. However, it is desirable to use the lithium soap. By using the lithium soap as the thickening agent, it is possible to improve shearing stability of the lubricants 51, 52, and 53. It is possible to improve a balance of characteristics of the lubricants 51, 52, and 53.

Examples of the base oil include mineral oil (refined mineral oil) such as paraffinic oil and naphthenic oil and synthetic oil such as polyolefine, ester, and silicone. Among these kinds of oil, one kind can be independently used or two or more kinds can be used in combination.

When the lubricants 51, 52, and 53 include the base oil and the thickening agent, each of the lubricants 51, 52, and 53 desirably includes an additive such as an antioxidant, an extreme-pressure agent, or a corrosion prevention agent or solid lubricant such as black lead, molybdenum sulfide, or polytetrafluoro-ethylene (PTFE). Consequently, it is possible to easily obtain the lubricants 51, 52, and 53 that can exhibit a high last non-seizure load and a high weld load for a long period.

In particular, each of the lubricants 51, 52, and 53 desirably includes the extreme-pressure agent. Consequently, even if the lubrication target section falls into an extreme-pressure lubrication state, it is possible to effectively prevent seizure and scuffing. In particular, it is desirable to use an organic molybdenum compound and zinc dialkyldithiophosphate as the extreme-pressure agent.

Since each of the lubricants 51, 52, and 53 includes the organic molybdenum compound, it is possible to effectively reduce friction in the lubrication target section. In particular, organic molybdenum exhibits an extreme pressure property and wear resistance equivalent to the extreme pressure property and the wear resistance of molybdenum sulfide. Moreover, the organic molybdenum is excellent in oxidation stability compared with the molybdenum sulfide. It is possible to achieve an increase in the life of the lubricants 51, 52, and 53. A content of the organic molybdenum compound in the lubricants 51, 52, and 53 is desirably, for example, 1 percentage by mass or more and 5 percentage by mass or less. A content of zinc dialkyldithiophosphate in the lubricants 51, 52, and 53 is desirably, for example, 1 percentage by mass or more and 5 percentage by mass or less.

Since the lubricants 51, 52, and 53 include the solid lubricant, it is possible to effectively increase both of the last non-seizure load and the weld load of the lubricants 51, 52, and 53.

In this way, when the lubricants 51, 52, and 53 are grease, it is possible to easily obtain the lubricants 51, 52, and 53 having the last non-seizure load and the weld load in the ranges explained above. A relation between the last non-seizure load and the weld load of grease and durability of the gear device is explained with reference to a specific example shown in Table 1 below.

TABLE 1

|  | Sample 1 | Sample 2 | Sample 3 | Sample 4 |
| --- | --- | --- | --- | --- |
| LNL [N] | — | 314 | 981 | 981 |
| WL [N] | 1961 | 2452 | 2452 | 3089 |
| LW1 | 208 | 256 | 470 | 498 |
| Evaluation | C | B | A | A |

In Table 1, "LNL" indicates the "last non-seizure load", "WL" indicates the "weld load", and "LWI" indicates the "load wear index". "samples 1 to 4" respectively base oil formed by refined mineral oil, a thickening agent formed by lithium soap, and grease (lubricant) including organic molybdenum and zinc dialkyldithiophosphate. Compounding ratios and types of these components are adjusted as appropriate. The "LNL", the "WL", and the "LWI" are measured according to ASTM D2596 explained above. "Evaluation" in Table 1 is relative evaluation based on a measurement result at the time when respective reduction gears including samples 1 to 4 are integrated in a test apparatus and continuously reciprocatingly turned and the number of times of the reciprocating turning is measured until an operation backlash exceeds an allowable range. The evaluation is higher as the measured number of times of the reciprocating turning is larger. The evaluation is higher in the order of "A", "B", and "C". In particular, the evaluation "A" indicates an excellent characteristic that cannot be realized by the reduction gear in the past.

The gear device 1 explained above can be manufactured as explained below.

Manufacturing Method for the Gear Device

A manufacturing method for the gear device according to the first embodiment is explained with reference to an example in which the gear device 1 is manufactured.

Figure 9:
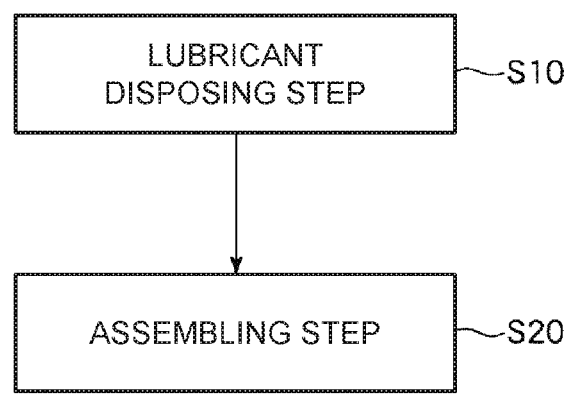
FIG. 9 is a flowchart for explaining a manufacturing method for the gear device shown in FIG. 2.
Figure 10:
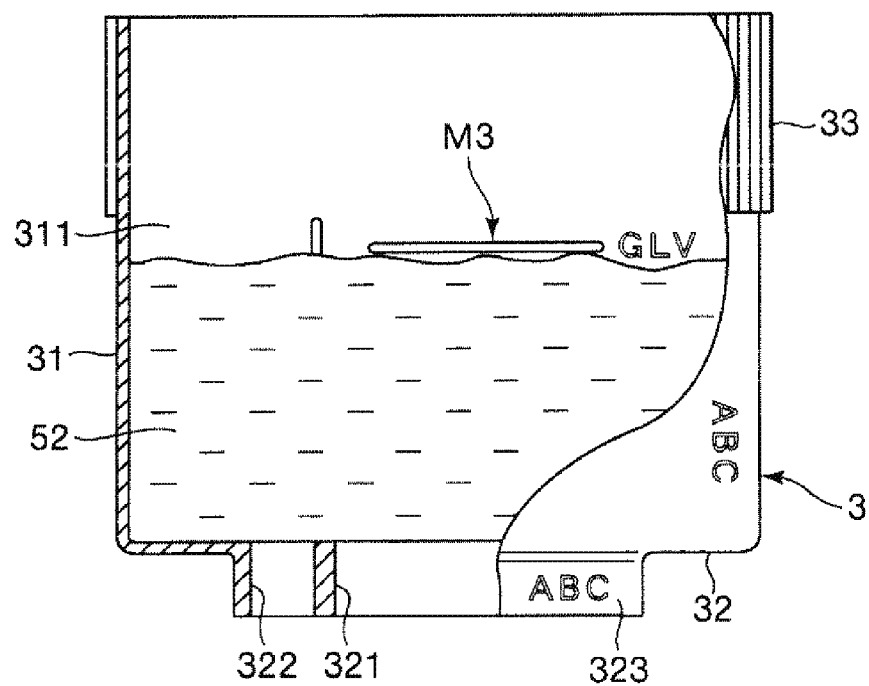
FIG. 10 is a diagram for explaining a first example (in the case of vertical disposition) of a lubricant disposing step shown in FIG. 9.
Figure 11:
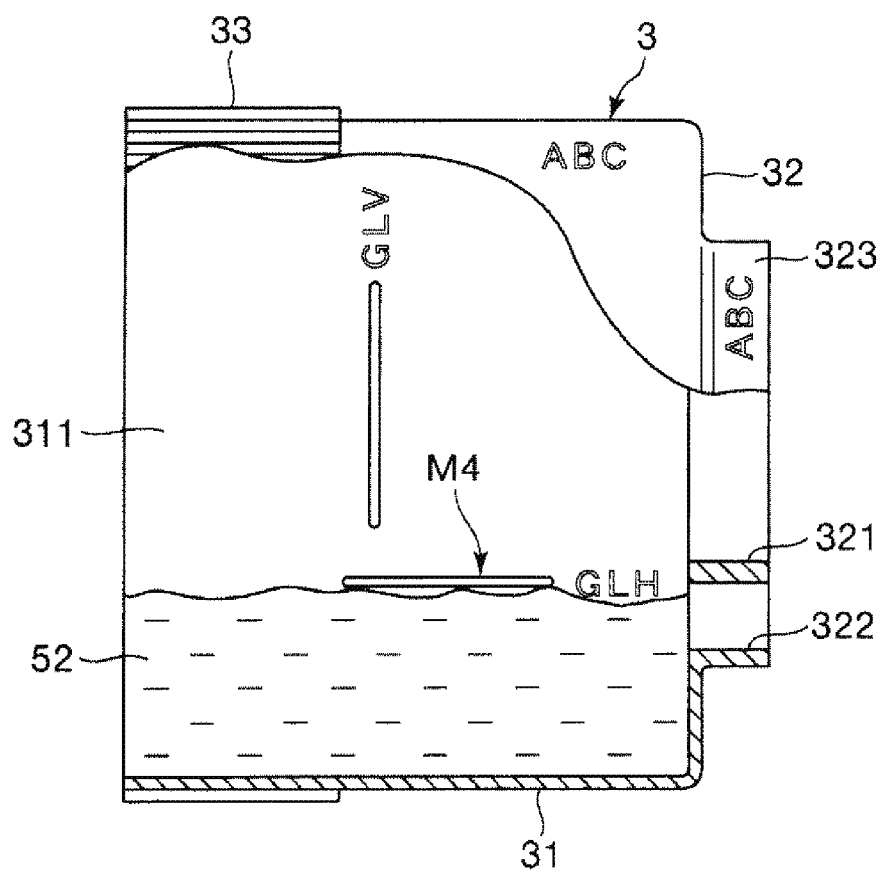
FIG. 11 is a diagram for explaining a second example (in the case of horizontal disposition) of the lubricant disposing step shown in FIG. 9.

FIG. 9 is a flowchart for explaining a manufacturing method for the gear device shown in FIG. 2. FIG. 10 is a diagram for explaining a first example (in the case of vertical disposition) of a lubricant disposing step shown in FIG. 9. FIG. 11 is a diagram for explaining a second example (in the case of horizontal disposition) of the lubricant disposing step shown in FIG. 9.

As shown in FIG. 9, the manufacturing method for the gear device 1 includes [1] a lubricant disposing step S10 and [2] an assembling step S20. The steps are sequentially explained below.

[1] Lubricant Disposing Step S10

First, although not shown in the figures, the flexible gear 3, the rigid gear 2, and the wave generator 4 are prepared.

A method of forming the flexible gear 3, the rigid gear 2, and the wave generator 4 is not particularly limited. Various kinds of mechanical machining and various molding methods can be used. Constituent materials of the flexible gear 3, the rigid gear 2, and the wave generator 4 are not particularly limited. Examples of the constituent materials include various ceramics materials, various metal materials, and various resin materials. Among these materials, one kind can be independently used or two or more kinds can be used in combination.

Subsequently, as shown in FIG. 10 or 11, the lubricant 52 is disposed on the inner side of the flexible gear 3. FIG. 10 shows a state in which the lubricant 52 is disposed on the inner side of the flexible gear 3 when the axis of the flexible gear 3 faces a direction along the vertical direction (in the case of vertical disposition). FIG. 11 shows a state in which the lubricant 52 is disposed on the inner side of the flexible gear 3 when the axis of the flexible gear 3 faces a direction along the horizontal direction (in the case of horizontal disposition).

In the case shown in FIG. 10, a supply amount of the lubricant 52 is measured to set the upper surface of the lubricant 52 to the height of the mark M3. In the case shown in FIG. 11, the supply amount of the lubricant 52 is measured to set the upper surface of the lubricant 52 to the height of the mark M4. Consequently, it is possible to dispose an appropriate amount of the lubricant 52 on the inner side of the flexible gear 3.

Although not shown in the figures, the lubricant 51 is disposed on at least one of the outer circumferential surface of the flexible gear 3 and the inner circumferential surface of the rigid gear 2. The lubricant 53 is disposed on the wave generator 4 according to necessity.

[2] Assembling Step S20

Subsequently, although not shown in the figures, the wave generator 4 is inserted into the inner side of the flexible gear 3. The flexible gear 3 and the rigid gear 2 are meshed with each other on the inside and the outside. When the wave generator 4 is inserted into the inner side of the flexible gear 3, the lubricant 52 disposed on the inner side of the flexible gear 3 is interposed between the flexible gear 3 and the wave generator 4. The sliding section 62 in which the lubricant 52 is disposed is formed. The lubricant 52 disposed on the inner side of the flexible gear 3 can be supplied to the inside of the wave generator 4 as well. As a result, the sliding section 63 in which the lubricant 53 is disposed can be formed. When the flexible gear 3 and the rigid gear 2 are meshed with each other on the inside and the outside, the lubricant 51 is interposed between the flexible gear 3 and the rigid gear 2. The meshing section 61 in which the lubricant 51 is disposed is formed.

The gear device 1 can be manufactured as explained above.

The manufacturing method for the gear device 1 explained above includes the lubricant disposing step S10 and the assembling step S20. In the lubricant disposing step S10, the lubricant (in the figures, the lubricant 52), the last non-seizure load of which is 300 N or more, is disposed on at least one member (in the figures, the flexible gear 3) of two members (in the figures, the flexible gear 3 and the wave generator 4) selected from the rigid gear 2, which is the "internal gear", the flexible gear 3, which is the "external gear" that meshes with the rigid gear 2, and the wave generator 4, which is the "sliding member" that slides with respect to the flexible gear 3. In the assembling step S20, the two members are assembled to interpose the lubricant between the two members. With the manufacturing method for the gear device 1, it is possible to obtain the gear device 1 capable of reducing damage such as wear and seizure for a long period.

Second Embodiment

A second embodiment of the invention is explained.

Figure 12:
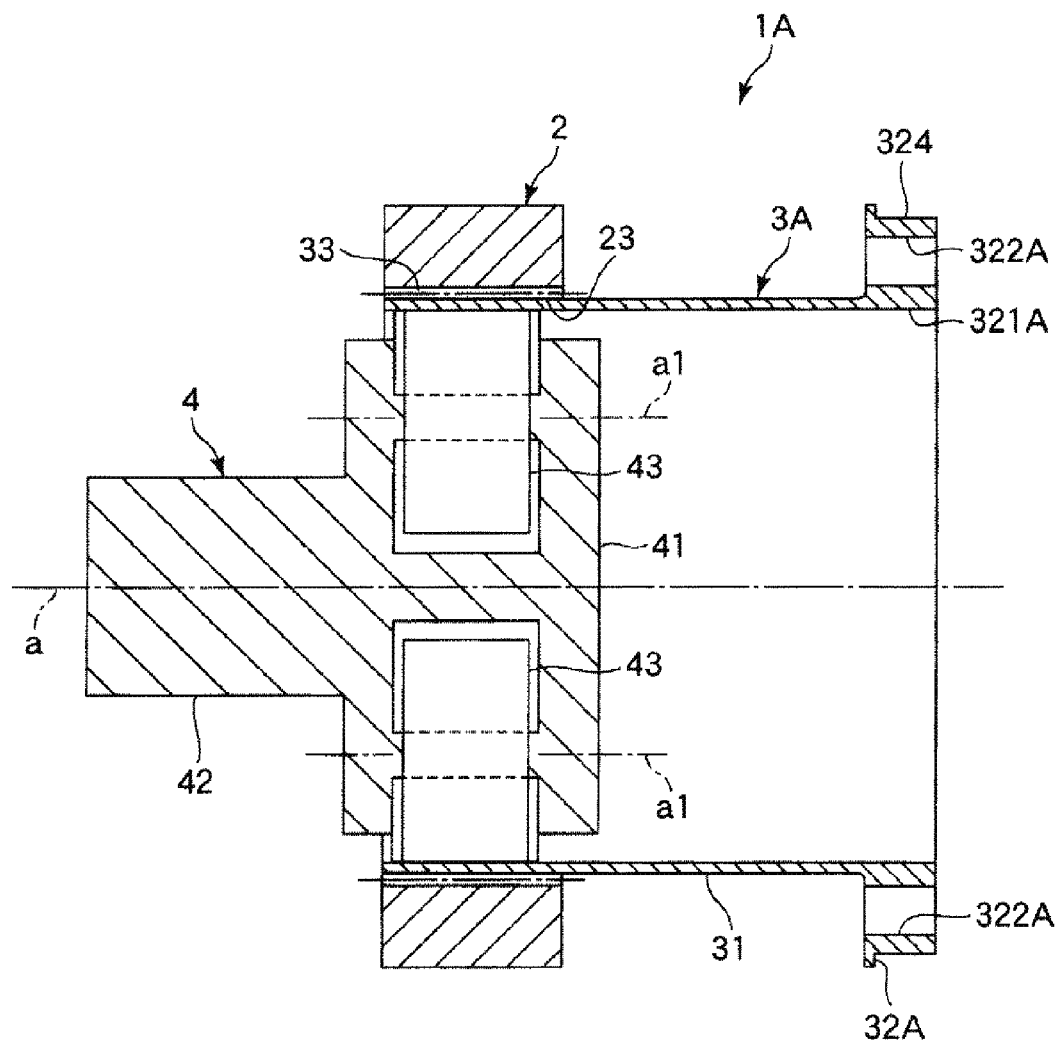
FIG. 12 is a longitudinal sectional view showing a gear device according to a second embodiment of the invention.

FIG. 12 is a longitudinal sectional view showing a gear device according to the second embodiment of the invention.

Note that, in the following explanation, concerning this embodiment, differences from the first embodiment are mainly explained. Explanation concerning similarities is omitted.

A gear device 1A shown in FIG. 12 includes a flexible gear 3A, which is an external gear of a hat type disposed on the inner side of the rigid gear 2.

The flexible gear 3A includes a flange section 32A provided to project to the opposite side of the axis "a" on one end portion side in the axis "a" direction of the trunk section 31 formed in a tubular shape around the axis "a". With the flexible gear 3A having such a shape, it is possible to realize satisfactory meshing of the flexible gear 3A with the rigid gear 2. It is possible to stably connect the input shaft or the output shaft to the flange section 32A.

In this embodiment, in the flange section 32A, a plurality of holes 322A piercing through the flange section 32A along the axis "a" are formed. The holes 322A can be used as screw holes through which screws for fixing the shaft body on the output side to the flange section 32A are inserted. The shaft body on the output side can be inserted through an inner circumferential section 321A of the flange section 32A.

As explained above, the gear device 1A includes the rigid gear 2, which is the "internal gear", the flexible gear 3A, which is the "external gear" that has flexibility and partially meshes with the rigid gear 2, and the wave generator 4 (the sliding member) that is in contact with the flexible gear 3A and moves a meshing position of the rigid gear 2 and the flexible gear 3A in the circumferential direction. Although not shown in the figure, like the lubricants 51, 52, and 53 in the first embodiment, lubricant, the last non-seizure load of which is 300 N or more, is disposed in at least one of a meshing section of the rigid gear 2 and the flexible gear 3A and a portion (a sliding section) where the flexible gear 3A and the wave generator 4 are in contact with each other.

Although not shown in the figure, markings same as the markings M1 and M2 in the first embodiment are inscribed on the outer surface of the flexible gear 3A. When a marking is provided on the outer surface of the flange section 32A, the marking only has to be provided on an outer surface 324 along the circumferential direction of the flange section 32A.

According to the second embodiment explained above, as in the first embodiment, it is possible to reduce damage to the gear device 1A for a long period.

Third Embodiment

A third embodiment of the invention is explained.

Figure 13:
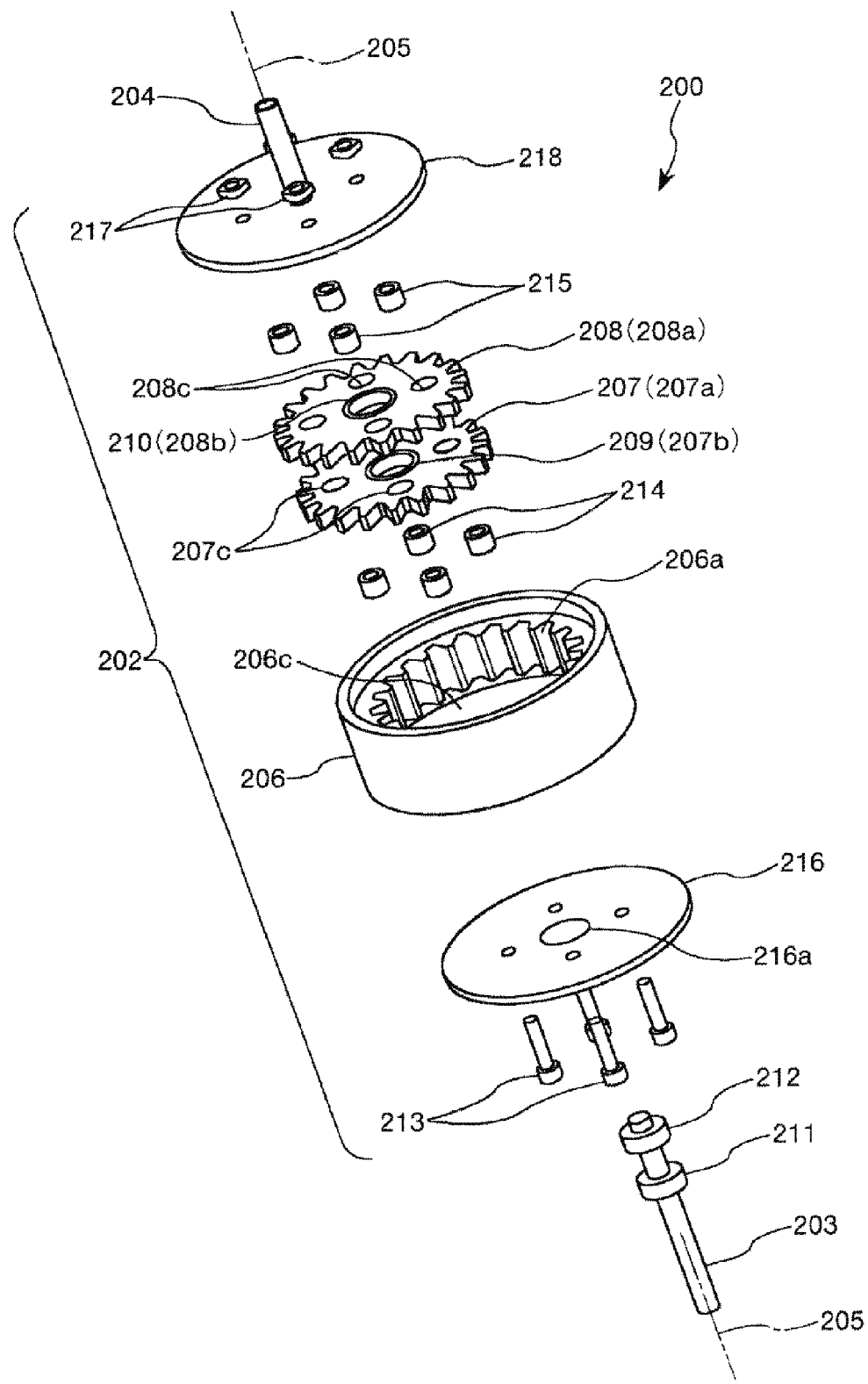
FIG. 13 is an exploded perspective view showing a gear device according to a third embodiment of the invention.
Figure 14:
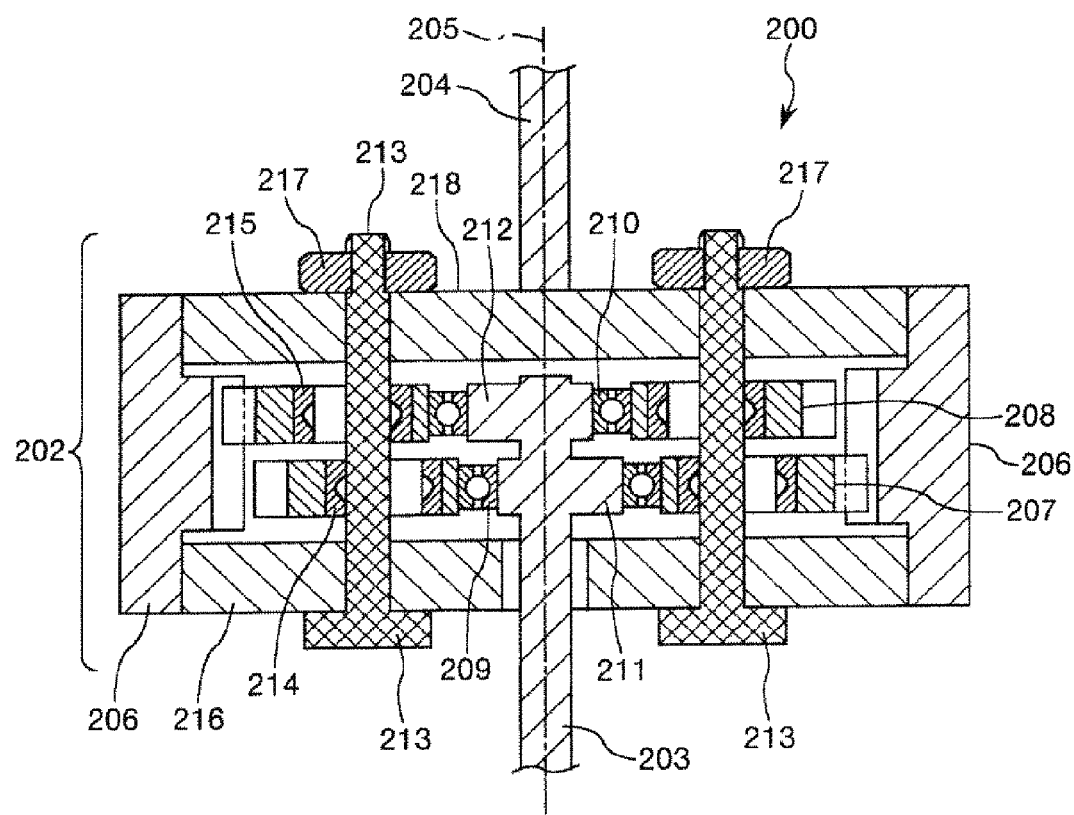
FIG. 14 is a longitudinal sectional view of the gear device shown in FIG. 13.

FIG. 13 is an exploded perspective view showing a gear device according to the third embodiment of the invention. FIG. 14 is a longitudinal sectional view of the gear device shown in FIG. 13.

Note that, in the following explanation, concerning this embodiment, differences from the embodiments explained above are mainly explained. Explanation concerning similarities is omitted.

A gear device 200 shown in FIGS. 13 and 14 includes a main body section 202 having a columnar external shape. A first rotating shaft 203 is provided on one side in the axial direction of the main body section 202. On the other hand, a second rotating shaft 204 is provided on the other side in the axial direction of the main body section 202. The first rotating shaft 203 and the second rotating shaft 204 turn around the same center axis 205. The center axis 205 is disposed on the same line as the axis of the main body section 202. When the first rotating shaft 203 is turned in a state in which the main body section 202 is fixed, the turning is decelerated by a mechanism in the main body section 202 explained below and output from the second rotating shaft 204. That is, the first rotating shaft 203 is an input shaft that rotates at high speed. The second rotating shaft 204 is an output shaft that rotates at low speed.

As shown in FIG. 13, the gear device 200 includes a cylindrical ring gear 206 including a hollow section 206c. A plurality of gear teeth 206a are formed in the inner circumference of the ring gear 206. A first revolving gear 207 and a second revolving gear 208 having outer circumferences slightly smaller than the inner circumference of the ring gear 206 are set on the inner side of the ring gear 206. A plurality of gear teeth 207a smaller in number than the number of teeth of the gear teeth 206a are disposed in the outer circumference of the first revolving gear 207. A plurality of gear teeth 208a same in number as the number of teeth of the gear teeth 207a are disposed in the outer circumference of the second revolving gear 208. The gear teeth 207a and the gear teeth 208a mesh with the gear teeth 206a.

A shaft hole 207b is provided in the center of the first revolving gear 207. Similarly, a shaft hole 208b is provided in the center of the second revolving gear 208. A first bearing 209 is set in the shaft hole 207b. Similarly, a second bearing 210 is set in the shaft hole 208b.

In the first rotating shaft 203, a first eccentric cam 211 and a second eccentric cam 212, which are circular cams eccentric by the same amount to opposite sides each other with respect to the center axis 205, are set. The first eccentric cam 211 is set in the inner ring of the first bearing 209. Similarly, the second eccentric cam 212 is set in the inner ring of the second bearing 210. Consequently, the center axis 205 is located between a portion where the gear teeth 207a mesh with the gear teeth 206a and a portion where the gear teeth 208a mesh with the gear teeth 206a.

In the first revolving gear 207, first through-holes 207c are provided in four places on a concentric circle centering on the center of the first revolving gear 207. Similarly, in the second revolving gear 208, second through-holes 208c are provided in four places on a concentric circle centering on the center of the second revolving gear 208. Through-pins 213 for extracting a movement of the rotation of the first revolving gear 207 are respectively inserted into the first through-holes 207c and the second through-holes 208c. Substantially cylindrical first elastic sections 214 having elasticity are fit in the inner circumferential walls of the first through-holes 207c by press-fitting. Similarly, substantially cylindrical second elastic sections 215 having elasticity are fit in the inner circumferential walls of the second through-holes 208c by press-fitting. The through-pins 213 pierce through the inner sides of the first elastic sections 214 or the second elastic sections 215.

The through-pins 213 are attached to a lower lid plate 216 having a disk shape on the first rotating shaft 203 side of the main body section 202 and fixed to an upper lid plate 218 having a disk shape by nuts 217 on the second rotating shaft 204 side. The lower lid plate 216 and the upper lid plate 218 are arranged along the axial direction of the center axis 205 and sandwich the ring gear 206 while leaving a gap to be capable of turning with respect to the ring gear 206.

A center hole 216a, into which the first rotating shaft 203 is inserted, is formed in the center of the lower lid plate 216. One end portion of the first rotating shaft 203 on the side of the first eccentric cam 211 and the second eccentric cam 212 projects into the main body section 202 from the lower lid plate 216. The other end portion of the first rotating shaft 203 projects to the outside of the main body section 202 from the lower lid plate 216. The second rotating shaft 204 is fixed to the center of the upper lid plate 218. Rotation torque of the upper lid plate 218 is transmitted to the second rotating shaft 204 according to the rotation of the upper lid plate 218.

As explained above, the gear device 200 includes the ring gear 206, which is the "internal gear", the first revolving gear 207 and the second revolving gear 208, which are the "external gears" that mesh with the ring gear 206, and the lower lid plate 216 and the upper lid plate 218, which are the "sliding members" that slide with respect to the ring gear 206. Although not shown in the figure, like the lubricants 51, 52, and 53 in the first embodiment, lubricant, the last non-seizure load of which is 300 N or more, is disposed in at least one of meshing sections of the ring gear 206 and the first revolving gear 207 and the second revolving gear 208 and sliding sections of the ring gear 206 and the lower lid plate 216 and the upper lid plate 218.

When the gear device 200 is manufactured, the lubricant only has to be disposed on at least one member of two members selected from the ring gear 206, the first revolving gear 207, the second revolving gear 208, the lower lid plate 216, and the upper lid plate 218.

According to the third embodiment explained above, as in the first and second embodiments, it is possible to reduce damage to the gear device 200 for a long period.

The robot, the gear devices, and the manufacturing methods for the gear devices according to the embodiments of the invention are explained above. However, the invention is not limited to this. The components of the sections can be replaced by any components having the same functions. Any other components may be added to the invention. The embodiments may be combined as appropriate.

Any steps may be added to the manufacturing methods for the gear devices according to the embodiments.

In the explanation in the embodiments, the base included in the robot is the "first member", the first arm is the "second member", and the gear device transmits a driving force from the first member to the second member. However, the invention is not limited to this. The invention is also applicable when an n-th (n is an integer equal to or larger than 1) arm is the "first member", a (n+1)-th arm is the "second member", and the gear device transmits a driving force from one side to the other side of the n-th arm and the (n+1)-th arm. The invention is also applicable when the gear device transmits a driving force from the second member side to the first member side.

In the embodiment, the six-axis vertical multi-joint robot is explained. However, the invention is not limited to this as long as a robot includes a gear device including a flexible gear. For example, the number of joints of the robot may be any number. The invention is also applicable to a horizontal multi-joint robot (a SCARA robot).

The configuration of the gear device is not limited to the configurations in the embodiments explained above as long as the gear device includes the internal gear, the external gear that meshes with the internal gear, and the sliding member that slides with respect to the internal gear or the external gear. The invention is applicable to various gear devices.

The entire disclosure of Japanese Patent Application No. 2016-148119, filed Jul. 28, 2016 is expressly incorporated by reference herein.

What is claimed is:

1. A robot comprising:
a first member;
a second member provided to be capable of turning with respect to the first member; and
a gear device configured to transmit a driving force from one side to another side of the first member and the second member, wherein
the gear device includes:
an internal gear;
an external gear having flexibility and configured to partially mesh with the internal gear;
a wave generator configured to be in contact with the external gear and move a meshing position of the internal gear and the external gear in a circumferential direction; and
a lubricant including a base oil, a lithium soap, and an organic molybdenum compound is disposed in at least one of a meshing section of the internal gear and the external gear and a portion where the external gear and the wave generator are in contact with each other, a last non-seizure load of the lubricant being 300 N or more, a content of the organic molybdenum compound being in the range of 1 to 5% by mass.

2. The robot according to claim 1, wherein, when the last non-seizure load of the lubricant is represented as L and a weld load of the lubricant is represented as W, W/L is 3.0 or more.

3. The robot according to claim 1, wherein a weld load of the lubricant is 1900 N or more.

4. The robot according to claim 1, wherein the lubricant includes an extreme-pressure agent.

5. A gear device comprising:
an internal gear;
an external gear configured to mesh with the internal gear;
a sliding member configured to slide with respect to the internal gear or the external gear; and
a lubricant including a base oil, a lithium soap, and an organic molybdenum compound is disposed in at least one of a meshing section of the internal gear and the external gear and a sliding section of the internal gear or the external gear and the sliding member, a last non-seizure load of the lubricant being 300 N or more, and a content of the organic molybdenum compound being in the range of 1 to 5% by mass.

6. A manufacturing method for a gear device comprising:
disposing a lubricant that includes a base oil, a lithium soap, and an organic molybdenum compound on at least one member of two members selected from an internal gear, an external gear that meshes with the internal gear, and a sliding member that slides with respect to the internal gear or the external gear; and
assembling the two members to interpose the lubricant between the two members,
wherein a last non-seizure load of the lubricant is 300 N or more, and
a content of the organic molybdenum compound is 1 to 5% by mass.

7. The robot of claim 1, wherein the lubricant further includes zinc dialkyldithiophosphate.

8. The gear device of claim 5, wherein the lubricant further includes zinc dialkyldithiophosphate.

9. The manufacturing method of claim 6, wherein the lubricant further includes zinc dialkyldithiophosphate.

* * * * *